March 25, 1941.    C. N. BERGSTROM    2,236,484
CLUTCH COMBINATION
Filed July 19, 1937
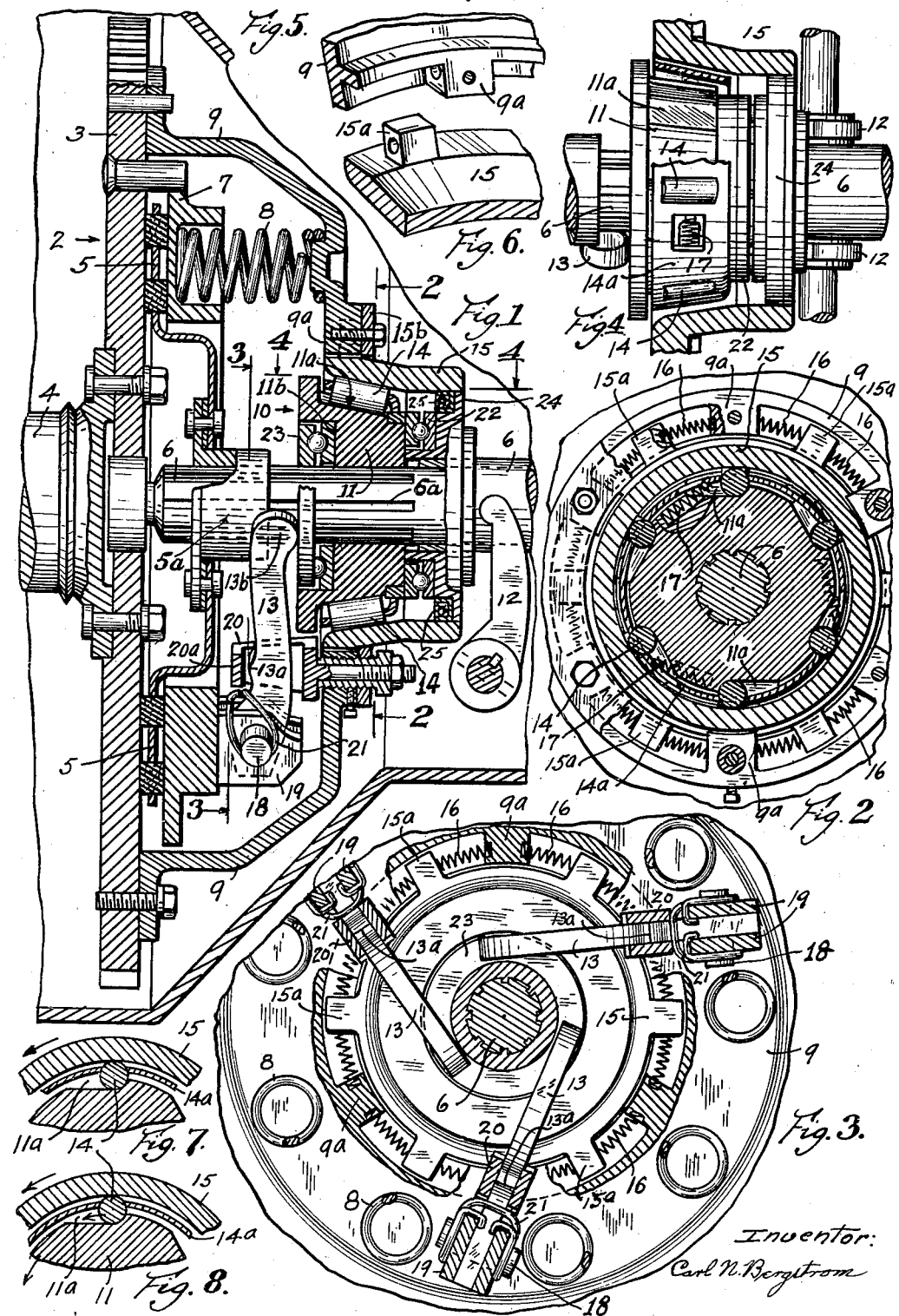
Inventor:
Carl N. Bergstrom

UNITED STATES PATENT OFFICE 2,236,484

CLUTCH COMBINATION

Carl N. Bergstrom, Portland, Oreg.

Application July 19, 1937, Serial No. 154,424

9 Claims. (Cl. 192—48)

The average type of clutch as used in automobiles or the like constitutes a disk friction plate splined to the transmission shaft and caused to grip with the fly wheel by means of a spring controlled pressure plate. Such a clutch functions properly under normal conditions but when subjected to certain conditions, the friction plate will slip and thus fail in driving said shaft at the same speed as the fly wheel, or may fail completely.

Such failure may occur when the vehicle is overloaded, or climbing a steep grade, or for other various reasons. Continued slipping of the disk friction plate soon causes the same to burn and the pressure plate to check, and also the heat from said slipping causes the springs to lose their tension, whereby the pressure of said plate is greatly reduced.

The object of my invention is to automatically aid in driving a driven shaft when the clutch provided therefor starts to fail whereby said clutch may then function as desired or to individually drive said shaft if the clutch should fail completely.

Another object is to provide an auxiliary shaft, driving means, that is simple and durable of construction and readily combined with a standard clutch wherein said clutch may be shifted in the usual manner and function independent of my device but if said clutch should fail, my device will automatically drive the shaft.

Another object is in providing a driving means which is secured to the driving portion of the clutch, for driving the driven portion of my device which is mounted to the driven shaft, and that said clutch together with my device may readily be controlled by the present clutch throwout fingers and the clutch fingers.

A still further object is to provide a means for absorbing the torque of a sudden rotating of the driving means to the driven member of my invention and thus to the shaft.

In the accompanying drawing,

Fig. 1 is a vertical section through a standard type of friction clutch as used in automobiles and shows my invention as functioning therewith, which consists of a sleeve shiftingly splined to the transmission shaft and provided with rollers for contacting a hub of a driving member, which in turn is secured to the driving shaft and preferably to the flywheel thereof, whereby said driving member may automatically drive said sleeve when the clutch starts to slip, and thereby drive said shaft at the same speed as said driving shaft, and also said sleeve is mounted to the shaft between the present throwout fingers and clutch fingers which are controlled by the foot pedal;

Fig. 2 is a fragmentary cross section taken on line 2—2 of Fig. 1 showing the sleeve of my device as splined to the shaft and the rollers set in inclined recesses on the periphery of said sleeve which contact the inner surface of the hub of the driving frame, the springs for holding the rollers in their innermost position in said recesses and also the resilient means for absorbing the shock of a sudden torque of the driving frame to the driven sleeve and shaft;

Fig. 3 is a section taken on the line 3—3 of Fig. 1 showing my device as viewed from the inside of the driving frame and the relation of the clutch fingers to the driven sleeve;

Fig. 4 is a plan view taken on the line 4—4 of Fig. 1 showing the rollers and the keeper ring therefor, and springs for returning said ring and rollers to their innermost position in the inclined recesses when the sleeve of my device is free from the hub of the driving frame, and also the fingers for shifting the sleeve and rollers of my device and controlling the clutch;

Fig. 5 is a fragmentary perspective of a portion of the driving frame as provided with stops against which bear springs that act as shock absorbing means for the floating hub which will absorb the torque of the same to the sleeve and driven shaft;

Fig. 6 is a fragmentary perspective of a portion of the periphery of the floating hub having lugs thereon to be spaced between and to coact with the stops on the driving frame through said springs;

Fig. 7 is a diagrammatic illustration showing the driving hub as rotating together with the driven sleeve, but not driving the same as, when the clutch functions properly in driving said shaft and also that the rollers are in their innermost position in the recesses on said sleeve;

Fig. 8 is a similar illustration showing the driving hub as driving said driven sleeve and thus the transmission shaft as when the clutch slips and also how the rollers may advance in the recesses to form a positive grip with said hub.

I have illustrated my invention as functioning with a standard clutch as used in present day automobiles. The driven sleeve of my device substitutes for the throwout bearing and sleeve as in present use with a standard clutch and is manually controlled by the clutch throwout fingers and the clutch fingers in the usual manner.

As seen in Figs. 1–8 my invention is combined with the clutch mechanism as 2 consisting of the flywheel 3, mounted to the end of the crankshaft 4, and the clutch friction plate 5 secured to the hub 5a which is splined to the transmission shaft 6. Said friction plate is caused to grip the face of the flywheel by the pressure plate 7 which in turn is controlled by the springs 8.

My invention is constructed and functions as follows: A frame 9, which may be constructed as a spider or as a cup-shaped member is secured to the flywheel 3 and functions as the driving member of my device. The springs 8 may be mounted to said frame. A sleeve as 10 is shiftingly splined to the transmission shaft 6 and the splines 6a have been lengthened to accommodate for the same. This sleeve is shifted by the fingers 12 and 13 which in turn are controlled by the foot lever which is not shown but readily understood.

The sleeve 10 consists mainly of a body portion 11 whose periphery is conical and is provided with recesses 11a which are of equal depth lengthwise thereof. Rollers 14 in said recesses are provided with a retainer ring 14a.

It is essential that the rollers be immediately returned to their innermost position as soon as the sleeve 10 is shifted to its inactive position and thus I provide springs 17 which are mounted in recesses 11a in said sleeve and bear against the retainer 14a to return the said rollers to their original position whereby the full length of the rollers may be positively positioned in said hub.

The driving frame 9 is provided with a hub 15 whose inner surface is conical to correspond with the inclination of the rollers 14 when said sleeve is in its inner or operative position as shown. The sleeve 10 bears at one end against a thrust bearing 22 set in a collar 24 which contains a grease retainer 25 and against said collar will bear the ends of the throwout fingers 12 when the sleeve is to be shifted to its inactive position. The other end of the sleeve 10 is provided with a recess 11b in which is mounted a thrust bearing 23 against which bear the ends 13b of the fingers 13 which engage or disengage the pressure plate 7.

As previously mentioned, the object of my invention is to drive the transmission shaft instantly the clutch plate fails to rotate the same at the same speed as said flywheel. When this occurs, the hub 15 drives the sleeve 10 through the gripping contact with the rollers 14 and will do so until the foot pedal is depressed and the sleeve 10 is shifted to its inactive position. Such gripping action takes place in that the hub 15 advances the rollers 14 in the recesses 11a toward the periphery of the sleeve 10 and thus securely grips said sleeve.

A sudden gripping of the hub 15 to the rollers may cause an undue strain upon the transmission shaft 6 and parts connected therewith, and thus I deem it advisable that said hub be a separate unit from the frame 9 and mounted thereto. This is accomplished by providing said hub with outwardly projecting spaced lugs 15a and the frame with stops 9a set therebetween. Springs 16 are provided between said stops and lugs to absorb said torque of the hub when gripping the sleeve 10. A ring 15b bolted to the frame 9 holds said hub 15 in position.

It is imperative that the sleeve 10 be shifted from the hub 15 before the friction plate is released and that the friction plate again be fully engaged with the flywheel before the sleeve 10 is shifted into contact with the hub 15. I provide means whereby the sleeve 10 may be shifted a short distance together with ends 13b of the fingers 13 which are pivotally mounted at one end on pins 18 in brackets 19 secured to the pressure plate 7. Said fingers will shift the pressure plate to release the same.

The fingers 13 are provided with projections 13a at one side thereof to function as fulcrums upon which said fingers may rock when said projections are moved to bear against the ends 20a of the yokes 20. A continued shifting of the sleeve will then disengage the pressure plate from the friction plate. A spring 21 on each clutch finger is in tension to cause the end 13b of the finger 13 to bear against the bearing 23 and hold the sleeve in its operative position when the clutch is fully engaged and also to return said sleeve to this position after having been disengaged.

Each yoke 20 is adjustable to maintain the proper clearance between the fulcrum point 13a and the end 20a of each yoke, whereby the sleeve 10 may be shifted out of operative position before the clutch is released and also to compensate for wear of the friction plate.

The operation of my device is as follows: Before the car is placed in motion, the foot pedal is depressed, whereby the sleeve 10 is first shifted to its inactive position, and then the clutch is released. Immediately after the clutch is again engaged and the foot pedal is fully released, the sleeve 10 will then engage with the driving member of my device. If the clutch functions in driving the transmission shaft at the same rate of speed as the driving shaft, the hub 15 will merely contact with the rollers on the sleeve 10 but will not drive the same as they rotate together.

The instant the clutch fails the rotation of the shaft is retarded and thus also the rotation of the sleeve of my device. The hub 15 then grips the rollers 14 on said sleeve and rolls them in the recesses 11a to create a positive grip of the same with said hub 15 to drive said transmission shaft.

Various means may be used to form a driving connection between the driving member and the driven sleeve of my device.

I claim:

1. In clutch mechanism, a driving shaft, a driven shaft, a primary clutch for connecting said shafts, and an auxiliary driving means comprising a member rigidly secured to the driving member of the primary clutch, a sleeve splined on said driven shaft, rollers interposed between the hub of said rigidly secured member and the sleeve, adapted to drive said sleeve when the primary clutch fails, and means for controlling said primary clutch and said auxiliary driving means.

2. In clutch mechanism, a driving shaft, a driven shaft, a primary clutch for connecting said shafts, and an auxiliary driving means comprising a member rigidly secured to the driving member of the primary clutch, a hub floatingly connected to said rigidly secured member, a sleeve splined on said driven shaft, rollers interposed between the hub and sleeve, adapted to drive said sleeve when the primary clutch fails, and means for controlling said primary clutch and said auxiliary driving means.

3. In clutch mechanism, a driving shaft, a driven shaft, a primary clutch for connecting said shafts, and an auxiliary driving means comprising a member rigidly secured to the driving member of the primary clutch, a hub floatingly connected to said rigidly secured member, a sleeve slidably splined on said driven shaft, rollers interposed between the hub and sleeve, adapted to drive said sleeve when the primary clutch fails, and means for controlling said primary clutch and said auxiliary driving means.

4. In clutch mechanism, a driving shaft, a driven shaft, a primary clutch for connecting said shafts, and an auxiliary driving means comprising a member rigidly secured to the driving member of the primary clutch, a hub connected to said rigidly secured member, a sleeve splined on said driven shaft, rollers interposed between the hub and sleeve, adapted to drive said sleeve when the primary clutch fails, resilient means for tending to hold said rollers at their innermost position in inclined recesses on the periphery of the sleeve, and means for controlling said primary clutch and said auxiliary driving means.

5. In clutch mechanism, a driving shaft, a driven shaft, a primary clutch for connecting said shafts, and an auxiliary driving means comprising a member rigidly secured to the driving member of the primary clutch, a hub floatingly and resiliently connected to said rigidly secured member, a sleeve splined on said driven shaft, rollers interposed between the hub and sleeve, adapted to drive said sleeve when the primary clutch fails, and means for controlling said primary clutch and said auxiliary driving means.

6. In clutch mechanism, a driving shaft, a driven shaft, a primary clutch for connecting said shafts, and an auxiliary driving means comprising a member rigidly secured to the driving member of the primary clutch, a hub connected to said rigidly secured member, a sleeve splined on said driven shaft, rollers interposed between the hub and sleeve, adapted to drive said sleeve when the primary clutch fails, and means for controlling said primary clutch and said auxiliary driving means, wherein the hub and sleeve are engaged after the primary clutch is engaged and disengaged before said primary clutch is disengaged.

7. In clutch mechanism, a driving shaft, a driven shaft, a primary clutch for connecting said shafts, and an auxiliary driving means comprising a member rigidly secured to the driving member of the primary clutch, a hub connected to said rigidly secured member, a sleeve splined on said driven shaft, rollers interposed between the hub and sleeve, adapted to drive said sleeve when the primary clutch fails, and means for controlling said primary clutch and said auxiliary driving means, comprising clutch fingers and the clutch throwout fingers in present use.

8. In a clutch mechanism, a driving shaft, a driven shaft, a primary clutch for connecting said shafts, and an auxiliary driving means comprising a member rigidly secured to the driving member of the primary clutch, a hub connected to said rigidly secured member, a sleeve splined on said driven shaft, rollers interposed between the hub and sleeve, resilient means for holding said rollers inactive until, when the primary clutch fails, they become active in driving said sleeve, and means for controlling said primary clutch and said auxiliary driving means.

9. In a clutch mechanism, a driving shaft, a driven shaft, a primary clutch for connecting said shafts, and an auxiliary driving means comprising a member rigidly secured to the driving member of the primary clutch, a hub connected to said rigidly secured member, a sleeve on said driven shaft, means whereby said hub at any portion of the inner periphery thereof will automatically and instantly engage said sleeve to rotate the same when the primary clutch fails, and means for controlling said primary clutch and said auxiliary driving means.

CARL N. BERGSTROM.